(12) United States Patent
Toriumi et al.

(10) Patent No.: US 6,647,212 B1
(45) Date of Patent: Nov. 11, 2003

(54) OPTICAL TRANSMITTER RECEIVER AND METHOD OF OPTICAL TRANSMISSION AND RECEPTION

(75) Inventors: Yoichi Toriumi, Tokyo (JP); Hideki Yoshida, Kanagawa (JP); Takayuki Mogi, Kanagawa (JP); Sumihiro Ookawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/551,432

(22) Filed: Apr. 18, 2000

(30) Foreign Application Priority Data

Apr. 26, 1999 (JP) .......................................... 11-118535

(51) Int. Cl.[7] .............................................. H04B 10/00
(52) U.S. Cl. ........................ 398/120; 398/135; 398/197
(58) Field of Search ................................. 359/152, 153, 359/187, 110; 398/135, 137, 120, 197, 94, 38

(56) References Cited

U.S. PATENT DOCUMENTS

| | | | |
|---|---|---|---|
| 4,777,653 A | * 10/1988 | Bonnerot et al. | ............. 455/69 |
| 5,631,757 A | * 5/1997 | Bodeep et al. | ............. 359/113 |
| 5,801,860 A | * 9/1998 | Yoneyama | ................ 359/124 |
| 5,822,099 A | * 10/1998 | Takamatsu | ................... 359/153 |
| 6,246,499 B1 | * 6/2001 | Kunito et al. | ................ 359/161 |

FOREIGN PATENT DOCUMENTS

JP          11-017618 A  *  1/1999

* cited by examiner

*Primary Examiner*—Kinfe-Michael Negash
(74) *Attorney, Agent, or Firm*—Sonnenschein, Nath & Rosenthal LLP

(57) ABSTRACT

An optical transmitter receiver is provided in which the power of light to be transmitted therefrom is set to a proper value by controlling the relative timing of changing the power of light to be transmitted therefrom. An optical transmitter receiver consists of an optical transmitter, an optical receiver, a signal level detector, and a signal level controller. The optical transmitter transmits a light signal to a mate optical transmitter receiver. The optical receiver receives a light signal from the mate optical transmitter receiver. The signal level detector detects the level of the light signal received by the optical receiver. The signal level controller changes the power of the light signal to be transmitted by the optical transmitter from one value to another according to the signal level detected by the signal level detector. The optical transmitter receiver further includes a delay device for delaying changing of the power of a light signal to be transmitted which is performed by the signal level controller.

3 Claims, 12 Drawing Sheets

OPTICAL TRANSMITTER RECEIVER AND METHOD OF OPTICAL TRANSMISSION AND RECEPTION

BACKGROUND OF THE INVENTION

1. Field of the Invention

The present invention relates to an optical transmitter receiver for performing optical communication over, for example, an optical transmission medium. More particularly, this invention is concerned with an optical transmitter receiver having a power-of-transmitted light control means for setting the power of light to be transmitted from the optical transmitter receiver to a proper value.

2. Description of the Related Art

An optical transmitter receiver in accordance with the present invention is configured as, for example, shown in FIG. 1.

Referring to FIG. 1, paired optical transmitter receivers 1a and 1b are optically connected to each other over an optical fiber 3, which is an optical transmission medium, between two apparatuses 2a and 2b. The optical transmitter receivers 1a and 1b are connected to the apparatuses 2a and 2b with physical layer control apparatuses 4a and 4b between them.

The optical transmitter receivers 1a and 1b have the same configuration. The internal configuration of the optical transmitter receiver 1b shown on the right-hand side of FIG. 1 is therefore not illustrated.

The optical transmitter receiver 1a shown on the left-hand side of FIG. 1 will be described below.

Referring to FIG. 1, the optical transmitter receiver 1a consists of a transmitter 5 and a receiver 6.

The transmitter 5 is, as illustrated, composed of a laser diode 5a that is a light emitting device, a drive circuit 5b for driving the laser diode 5a, and a shutdown circuit 5c for controlling driving performed by the drive circuit 5b.

The laser diode 5a converts an input signal into a laser beam whose intensity is proportional to the level of the input signal, and transmits the laser beam to the other optical transmitter receiver 1b over the optical fiber 3.

Moreover, the drive circuit 5b drives the laser diode 5a to luminescence according to transmission data Tx Data fed from the physical laser control unit 4a.

The shutdown circuit 5c actuates the drive circuit 5b according to a transmission instruction signal Tx Enable fed from the physical layer control apparatus 4a.

In contrast, the receiver 6 is, as shown in FIG. 1, composed of a photodiode 6a serving as a light receiving device, a current-voltage amplifier 6b, a post-amplifier 6c, a peak hold circuit 6d, and a signal detection circuit 6e.

The photodiode 6a receives a light signal sent-from the other optical transmitter receiver 1b (shown on the right-hand side in the drawing) over the optical fiber 3, and outputs an electric signal proportional to the light signal.

The current-voltage amplifier 6b amplifies an output signal of the photodiode 6a.

The post-amplifier 6c amplifies an output signal of the current-voltage amplifier 6b, and transmits a resultant signal as reception data Rx Date to the physical layer control apparatus 4a.

The peak hold circuit 6d detects the peak of the output signal of the current-voltage amplifier 6b.

The signal detection circuit 6d detects a signal output from the peak hold circuit 6d and transmits a reception acknowledgement signal to the physical layer control apparatus 4a.

The physical layer control apparatus 4a controls communications according to a protocol whose level is higher by one step than the protocol according to which the optical transmitter receiver 1a performs communications. Transmission data Tx Date and a transmission instruction signal Tx Enable are sent from the apparatus 2a to the optical transmitter receiver 1a. The optical transmitter receiver 1a transmits reception data Rx Data and a reception acknowledgement signal Rx SD to the apparatus 2a.

When the optical transmitter receivers 1a and 1b have the foregoing components, if the apparatus 2a outputs transmission data to the associated physical layer control apparatus 4a, the physical layer control apparatus 4a feeds the transmission instruction signal Rx Enable to the shutdown circuit 5c in the transmitter 5 of the optical transmitter receiver 1a. Consequently, the drive circuit 5b is actuated.

When the physical layer control apparatus 4a feeds transmission data Tx Date to the drive circuit 5b in the transmitter 5 of the optical transmitter receiver 1a, the drive circuit 5b drives the laser diode 5a according to the transmission data. This causes the laser diode 5a to emit light whose intensity is proportional to the transmission data.

A laser beam emitted from the laser diode 5a included in the other optical transmitter receiver 1b falls on the photodiode 6a in the receiver 6 of the optical transmitter receiver 1a over the optical fiber 3. This causes the photodiode 6a to output an electric signal proportional to the incident light. The electric signal is amplified by the current-voltage amplifier 6b, and then further amplified by the post-amplifier 6c. An output signal of the post-amplifier 6c is input as reception data Rx Data to the physical layer control apparatus 4a. An output signal of the current-voltage amplifier 6b has its peak detected by the peak hold circuit 6d. A reception acknowledgement signal Rx SD is input to the physical layer control apparatus 4a via the signal detection circuit 6e. The physical layer control apparatus 4a transmits reception data to the apparatus 2a.

The internal configuration of the optical transmitter receiver 1b is identical to that of the optical transmitter receiver 1a. The apparatus 2a transmits transmission data Tx Data to the other apparatus 2b, and the other apparatus 2b transmits transmission data Tx Data to the apparatus 2b. Consequently, optical communication is performed between the apparatuses 2a and 2b.

A description will be made of an optical fiber adopted as the optical fiber 3 and characterized by an optical transmission loss of 0.1 dB/m relative to any wavelength λ of light to be transmitted, for example, 650, 780, 850, 1300, 1500, or 1550 nm.

Specifically, a plastic optical fiber is adopted. The sensitivity of the photodiode 6a is set to 0.5 A/W, and a gain to be produced by the current-voltage amplifier 6b is set to 4 kΩ. A maximum amplitude of a signal that can be output from the current-voltage amplifier 6a is set to 1 Vp-p, and a minimum amplitude of a signal that can be input to the post-amplifier 6c is set to 0.2 Vp-p. In practice, for example, a silicon pin photodiode and a bipolar chip set will do.

Since the maximum output level of the current-voltage amplifier 6b is 1 Vp-p and the minimum input level of the post-amplifier 6c is 0.2 Vp-p, a dynamic range offered for an output of the current-voltage amplifier 6b is from 0.2 to 1.0 Vp-p.

Since a gain to be produced by the current-voltage amplifier 6b is 4 kΩ, a dynamic range offered for an input of the current-voltage amplifier 6b is from 0.05 to 0.25 mAp-p.

Since the sensitivity of the photodiode 6a is 0.5 A/W, a dynamic range offered for an input of the photodiode 6a is from 0.1 to 0.5 mWp-p.

Assuming that light received by the optical transmitter receiver 1a or 1b falls on the photodiode with the power thereof 100% maintained, a dynamic range offered for received light by the optical transmitter receiver 1a or 1b is from 0.1 to 0.5 mWp-p.

Assume that the optical fiber 3 has lengths ranging from 0 to 70 m. In this case, when the power of light transmitted from the optical transmitter receiver 1a or 1b is 0.5 mWp-p, the power of light received by the other optical transmitter receiver 1b or 1a varies as expressed with a curve E in FIG. 2. When the optical fiber 3 has a length of 0 m, the power of received light is 0.5 mWp-p. When the optical fiber 3 has a length of 70 m, the power of received light is 0.1 mWp-p. This range of powers agrees with the aforesaid dynamic range offered by the optical transmitter receiver.

Assuming that the optical fiber 3 has lengths ranging from 30 to 100 m, the power of received light varies as expressed with a curve F in FIG. 2, though the power of light to be transmitted remains 1.0 mWp-p. Specifically, when the optical fiber 3 has a length of 30 m, the power of received light is 0.5 mWp-p. When the optical fiber 3 has a length of 100 m, the power of received light is 0.1 mWp-p. This range of powers agrees with the aforesaid dynamic range offered by the optical transmitter receiver.

Assuming that the power of light to be transmitted remains constant, unless a distance of optical transmission permitted by the optical fiber 3 falls below 70 m, the power of received light falls outside the dynamic range offered by the optical transmitter receiver. When the distance of optical transmission exceeds 70 m, the power of light to be transmitted must be changed from one value to another.

The optical transmitter receiver capable of changing the power of light to be transmitted is configured as shown in FIG. 3.

Referring to FIG. 3, the optical transmitter receiver 1a or 1b is different from the optical transmitter receiver 1a or 1b shown in FIG. 2 in a point that the optical transmitter receiver has a controller 7.

The controller 7 consists of a power-of-received light detection circuit 7a and a modulation control circuit 7b. The power-of-received light detection circuit 7a inputs a detection signal from the peak hold circuit 6d in the receiver 6. The modulation control circuit 7b inputs a power-of-received light detection signal from the power-of-received light detection circuit 7a.

The power-of-received light detection circuit 7a makes a judgment as described later according to a peak value detected by the peak hold circuit 6d, and outputs a power-of-received light detection signal RxPower Detect to the modulation control circuit 7b.

The modulation control circuit 7b controls modulation performed by the drive circuit 5b according to the power-of-received light detection signal output from the power-of-received light detection circuit 7a, and sets the power of light to be transmitted to either of two values.

The optical transmitter receiver 1a or 1b having the foregoing components performs optical communication in the same manner as the optical transmitter receiver 1a or 1b shown in FIG. 1 does.

Assume that the optical transmission loss is 0.1 dB/m and the dynamic range for received light is from 0.1 to 0.5 mWp-p. In this case, when the optical fiber 3 has lengths ranging from 0 to 60 m, the power of received light varies as expressed with a curve E shown in FIG. 4, though the power of light to be transmitted remains 0.500 mWp-p. Specifically, when the optical fiber 3 has a length of 0 m, the power of received light is 0.500 mWp-p. When the optical fiber 3 has a length of 60 m, the power of received light is 0.126 mWp-p.

When the power of received light is 0.126 mWp-p or less, the peak value of an output signal of the current-voltage amplifier 6b is 0.251 Vp-p or less. At this time, the power-of-received light detection circuit 7a judges that the power of received light is too low, and transmits a high-level signal as a power-of-received light detection signal to the modulation control circuit 7b. The power of light to be emitted from the laser diode 5a is thus changed to 1.0 mWp-p (See an arrow E1 in FIG. 4).

When the optical fiber 3 has lengths ranging from 60 to 100 m, the power of received light varies as expressed with a curve F in FIG. 4, though the power of light to be transmitted remains 1.000 mWp-p. Specifically, when the optical fiber 3 has a length of 60 m, the power of received light is 0.251 mWp-p. When the optical fiber 3 has a length of 100 m, the power of received light is 0.100 mWp-p. The power of received light falls within the aforesaid dynamic range offered by the optical transmitter receiver.

When the optical fiber 3 has lengths ranging from 100 to 40 m, the power of received light varies as expressed with a curve F in FIG. 4, though the power of light to be transmitted remains 1.000 mWp-p. Specifically, when the optical fiber 3 has a length of 100 m, the power of received light is 0.100 mWp-p. When the optical fiber has a length of 40 m, the power of received light is 0.398 mWp-p.

When the power of received light is 0.398 mWp-p or more, the peak value of an output signal of the current-voltage amplifier 6b is 0.398 Vp-p or more. At this time, the power-of-received light detection circuit 7a judges that the power of received light is too high, and transmits a low-level signal as a power-of-received light detection signal to the modulation control circuit 7b. The power of light to be emitted from the laser diode 5a is thus changed to 0.500 mWp-p (see an arrow F1 in FIG. 4).

When optical fiber 3 has lengths ranging from 40 to 0 m, the power of received light varies as expressed with a curve E in FIG. 4, though the power of transmitted light remains 0.500 mWp-p. Namely, when the optical fiber 3 has a length of 40 m, the power of received light is 0.199 mWp-p. When the optical fiber 3 has a length of 0 m, the power of received light is 0.500 mWp-p. The power of received light falls within the dynamic range offered by the optical transmitter receiver.

The power of light to be transmitted is changed between two values according to the peak value of the power of received light. Thus, as long as a distance of optical transmission is 100 m or less, the power of received light falls within the aforesaid dynamic range offered by the optical transmitter receiver.

However, the optical transmitter receiver 1a or 1b capable of changing the power of light to be transmitted shown in FIG. 3 has drawbacks described below.

Assume that the optical fiber 3 has a length of 80 m and the optical transmitter receiver 1a starts optical communication. In this case, as seen in FIG. 5 and FIG. 6, when the power of light transmitted initially is 0.500 mWp-p, the power of light received by the optical transmitter receiver 1b is 0.079 mWp-p. The power of received light, that is, 0.079 mWp-p is lower than 0.126 mWp-p that is a criterion specified in the power-of-received light detection circuit 7a.

The power-of-received light detection circuit 7a therefore judges that the power of received light is too low, and outputs a high-level signal as a power-of-received light detection signal to the modulation control circuit 7b. Consequently, the power of light to be transmitted from the optical transmitter receiver 1b is changed from 0.500 mWp-p to 1.000 mWp-p.

Thereafter, when the optical fiber 3 has a length of 80 m, the power of light transmitted from the optical transmitter receiver 1b is 1.000 mWp-p, and the power of light received by the optical transmitter receiver 1a is 0.158 mWp-p. The power of received light, that is, 0.158 mWp-p is larger than 0.126 mWp-p. The power-of-received light detection circuit 7a in the controller 7 of the optical transmitter receiver 1a therefore misjudges that the distance of optical transmission is 50 m (the optical fiber 3 has a length of 50 m), and that the power of received light is optimal. Consequently, the power-of-received light detection circuit 7a outputs a low-level signal as a power-of-received light detection signal to the modulation control circuit 7b.

Since the power of light transmitted from the optical transmitter receiver 1a remains 0.500 mWp-p, the power of light received by the optical transmitter receiver 1b is 0.079 mWp-p. The power of received light is lower than 0.100 mWp-p, and falls outside the dynamic range offered by the optical transmitter receiver.

As mentioned above, when the optical transmitter receiver 1a or 1b changes the power of light to be transmitted on its own judgment, the power of light to be transmitted becomes different between the paired optical transmitter receivers. This disables appropriate optical communication.

Accordingly, an object of the present invention is to provide an optical transmitter receiver in which the power of light to be transmitted therefrom is set to a proper value by controlling the relative timing of changing the power of light to be transmitted therefrom from one value to another.

SUMMARY OF THE INVENTION

According to the present invention, the foregoing object is accomplished with an optical transmitter receiver consisting of an optical transmitter, an optical receiver, a signal level detecting means, and a signal level control means. The optical transmitter transmits a light signal to a mate optical transmitter receiver. The optical receiver receives a light signal from the mate optical transmitter receiver. The signal level detecting means detects the level of the light signal received by the optical receiver. The signal level control means changes the power of the light signal to be transmitted from the optical transmitter from one value to another according to the signal level detected by the signal level detecting means. The optical transmitter receiver further includes a delay means for delaying changing of the power of a light signal to be transmitted which is performed by the signal level control means.

Owing to the above configuration, the optical transmitter receiver has the delay means for delaying changing of the power of a light signal to be transmitted which is performed by the signal level control means. Changing of the power of a light signal to be transmitted is therefore delayed.

The optical transmitter receiver can therefore transmit a light signal to the mate optical transmitter receiver without changing the power of the light signal to be transmitted. Thereafter, the optical transmitter receiver uses the signal level detecting means to detect the power of light received from the mate optical transmitter receiver, and changes the power of light to be transmitted to an optimal value.

Unlike the conventional optical transmitter receivers, it will not take place that one of optical transmitter receivers changes the power of light to be transmitted on its own judgment.

The above object is accomplished with a method of optical transmission and reception comprising a transmission step, a reception step, a signal level detection step, a delay step, and a signal level control step. At the transmission step, a light signal is transmitted to a mate optical transmitter receiver. At the reception step, a light signal is received from the mate optical transmitter receiver. At the signal level detection step, the level of the received light signal is detected. At the delay step, the signal detected at the signal level detection step is delayed. At the signal level control step, the power of a light signal to be transmitted at the transmission step is changed based on the level of the signal delayed at the delay step.

According to the method, the signal detected at the signal level detection step is delayed at the delay step. Changing of the power of a light signal to be transmitted is delayed.

A light signal is therefore transmitted to a mate optical transmitter receiver without the necessity of changing the power of the light signal to be transmitted. Thereafter, the power of a light signal to be transmitted at the transmission step is changed based on the level of the signal delayed at the delay step.

It will therefore not take place that the mate optical transmitter receiver changes the power of light to be transmitted on its own judgment.

DESCRIPTION OF THE PREFERRED EMBODIMENTS

Referring to FIG. 7 to FIG. 12, preferred embodiments of the present invention will be described below.

The embodiments to be described below are preferred embodiments of the present invention. Technologically preferred limitations are therefore imposed. However, the present invention will not be limited to these embodiments unless otherwise described below.

Figure 1:
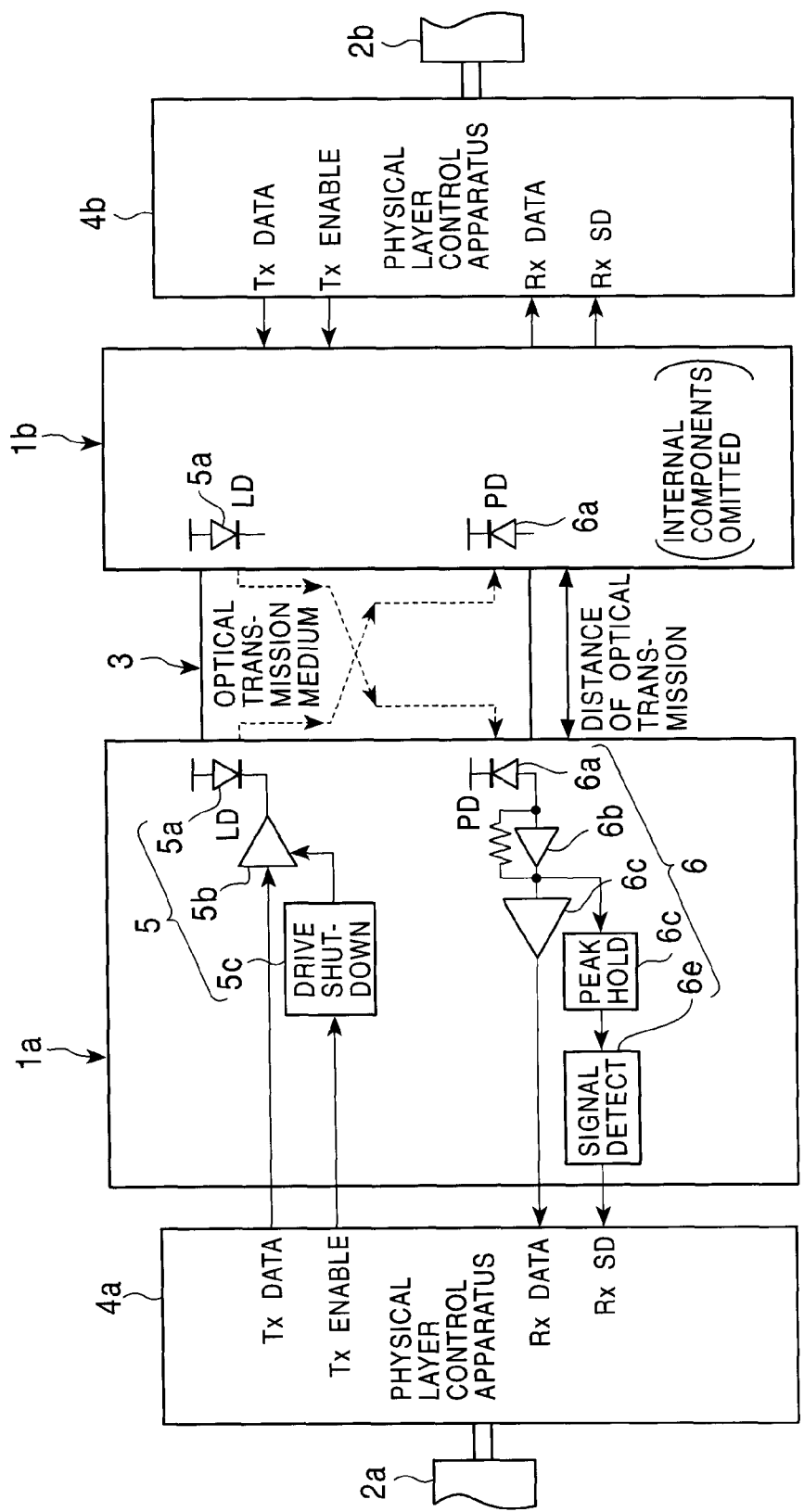
FIG. 1 is a schematic block diagram showing the used state of an example of an optical transmitter receiver in accordance with the present invention.
Figure 2:
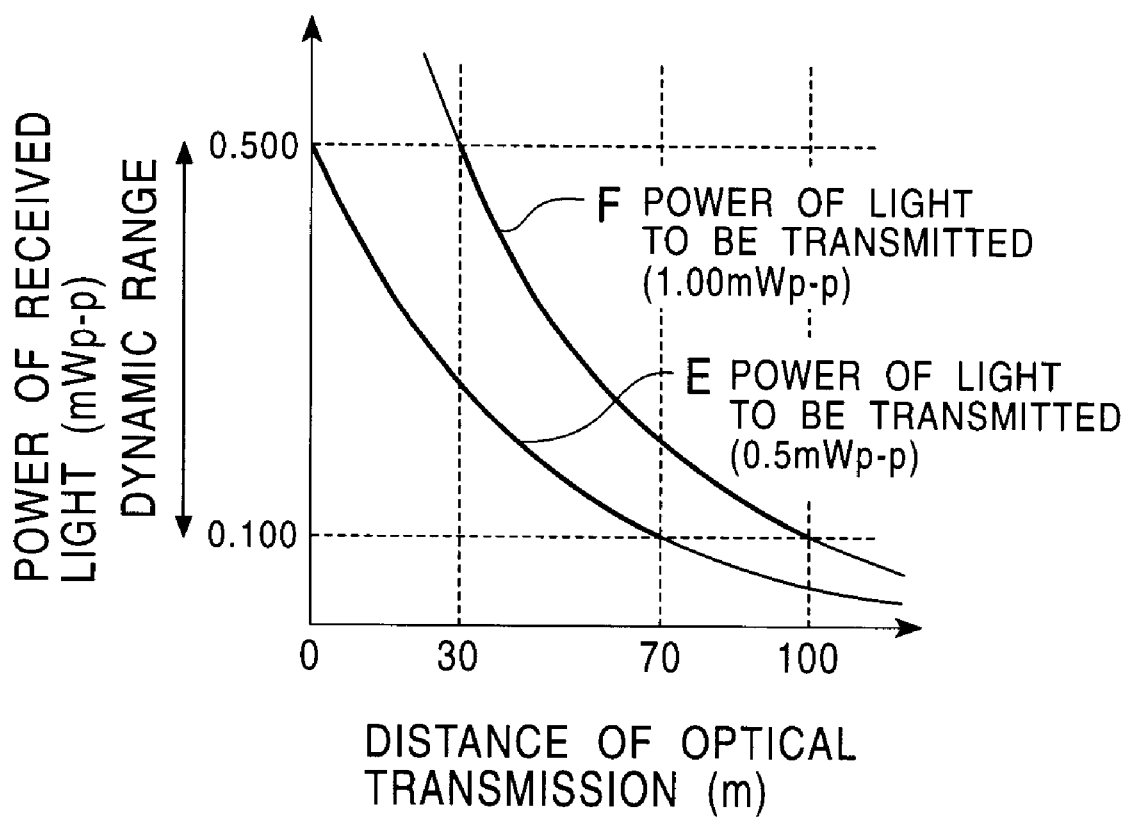
FIG. 2 is a graph expressing the relationship between distances of optical transmission performed by the optical transmitter receivers shown in FIG. 1 and powers of received light.
Figure 3:
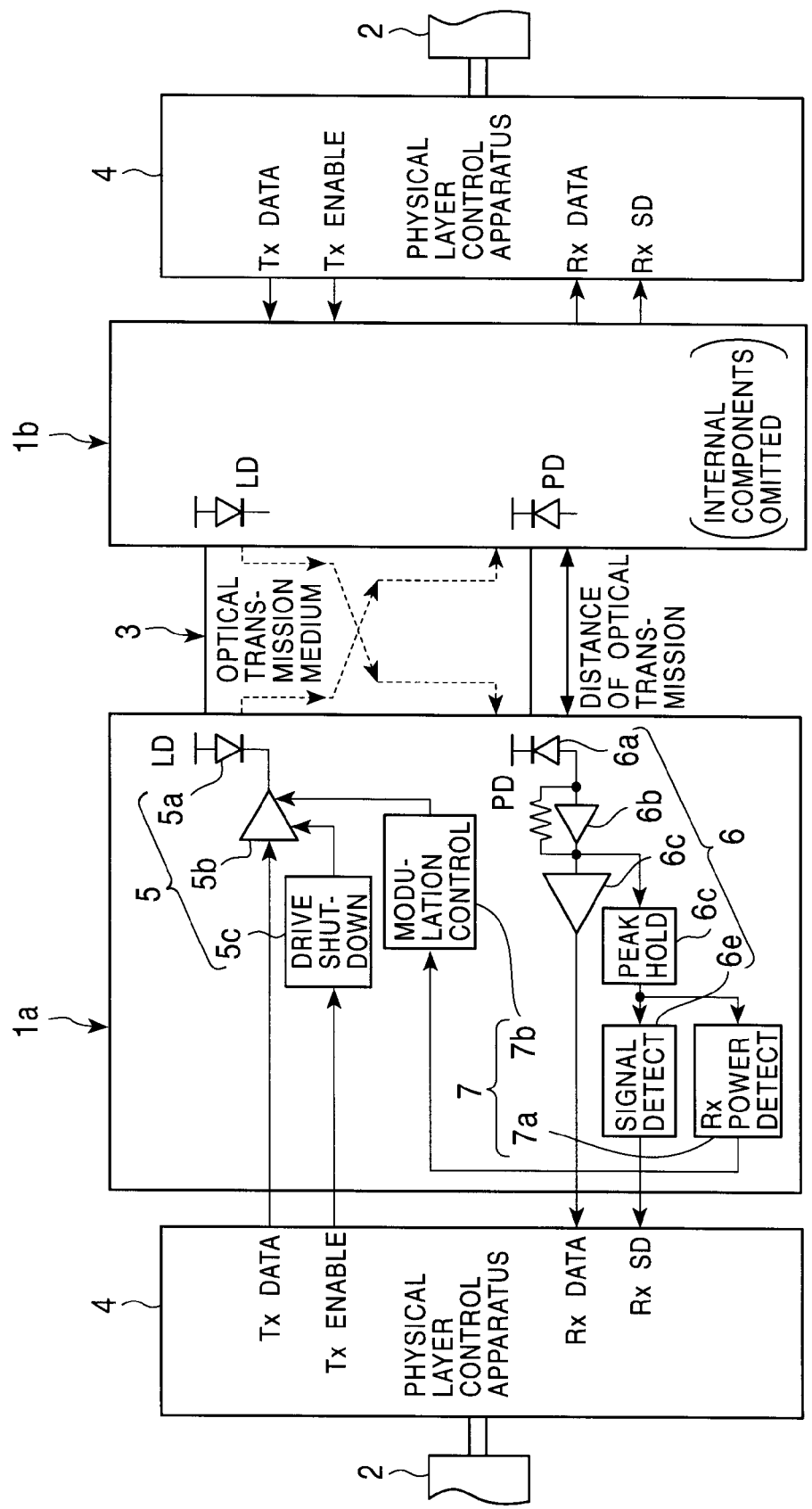
FIG. 3 is a schematic block diagram showing the used state of an example of a conventional optical transmitter receiver.
Figure 4:
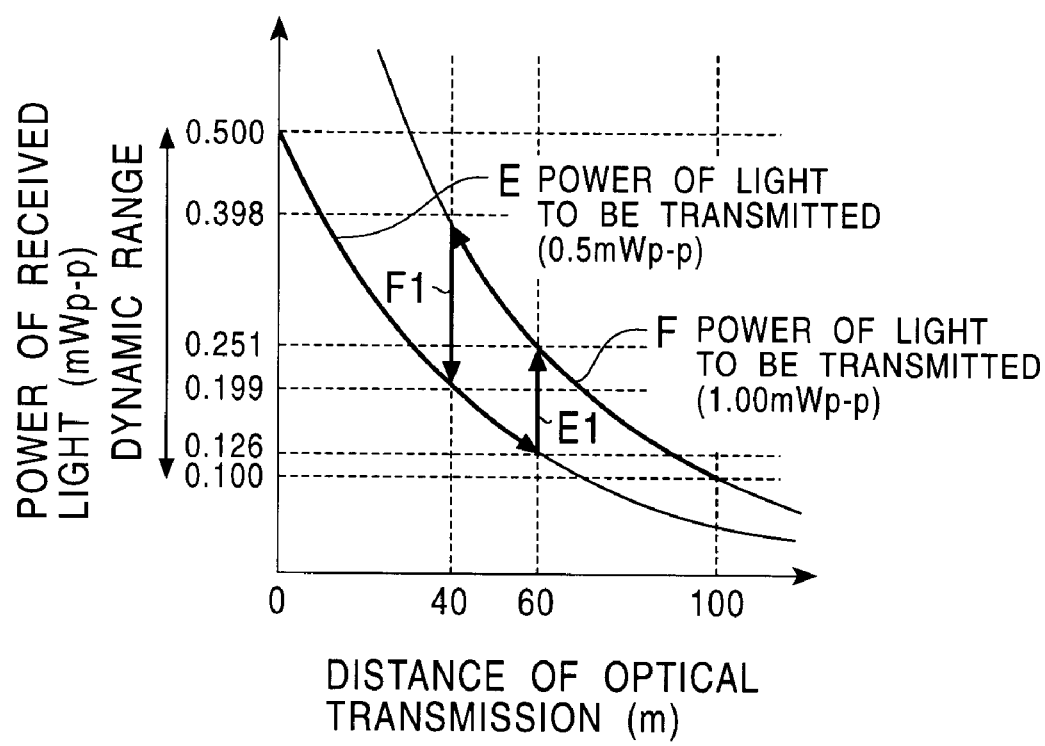
FIG. 4 is a graph expressing the relationship between distances of optical transmission performed by the optical transmitter receivers shown in FIG. 3 and powers of received light.
Figure 5:
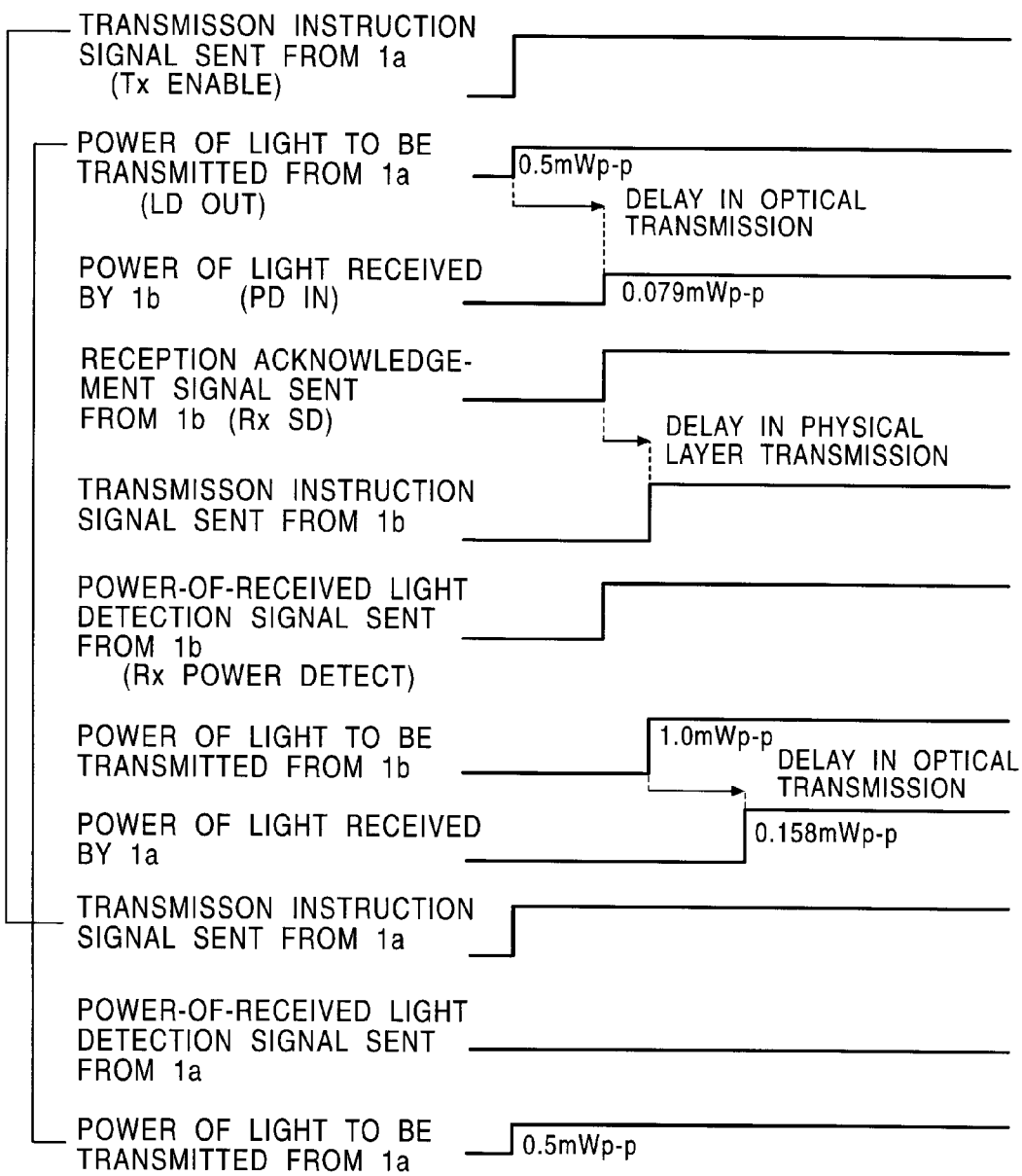
FIG. 5 is a timing chart expressing signals sent from the components of the optical transmitter receivers shown in FIG. 3.
Figure 6:
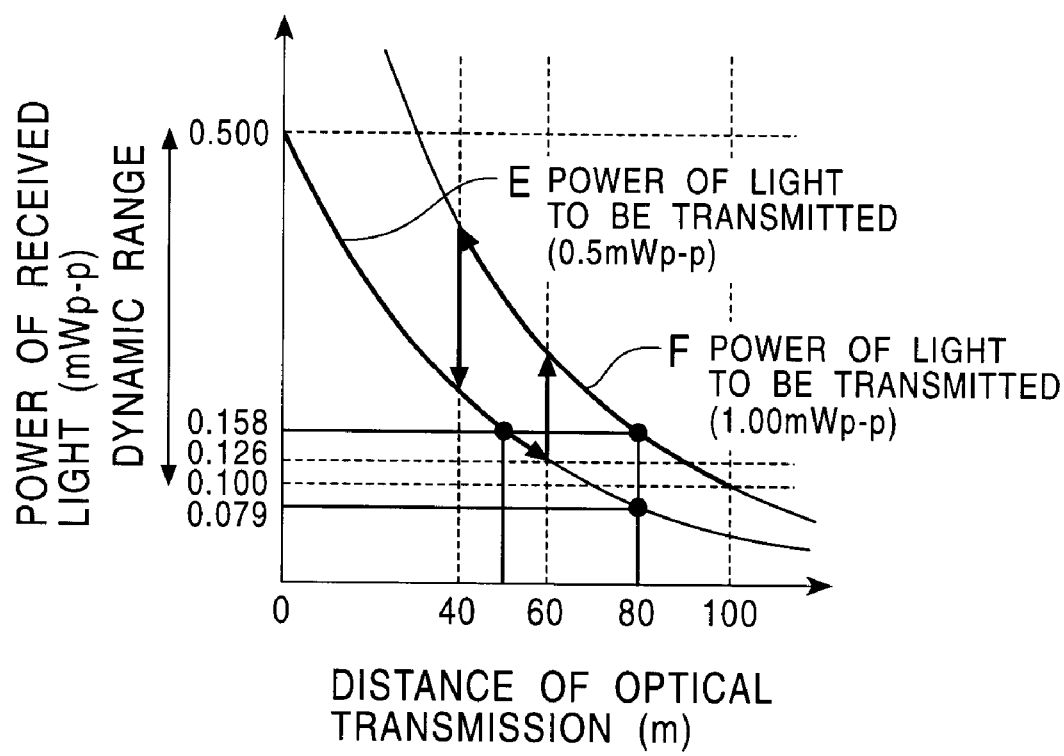
FIG. 6 is a graph similar to the one shown in FIG. 4 indicating that the optical transmitter receiver shown in FIG. 3 has incorrectly changed the power of light to be transmitted.
Figure 7:
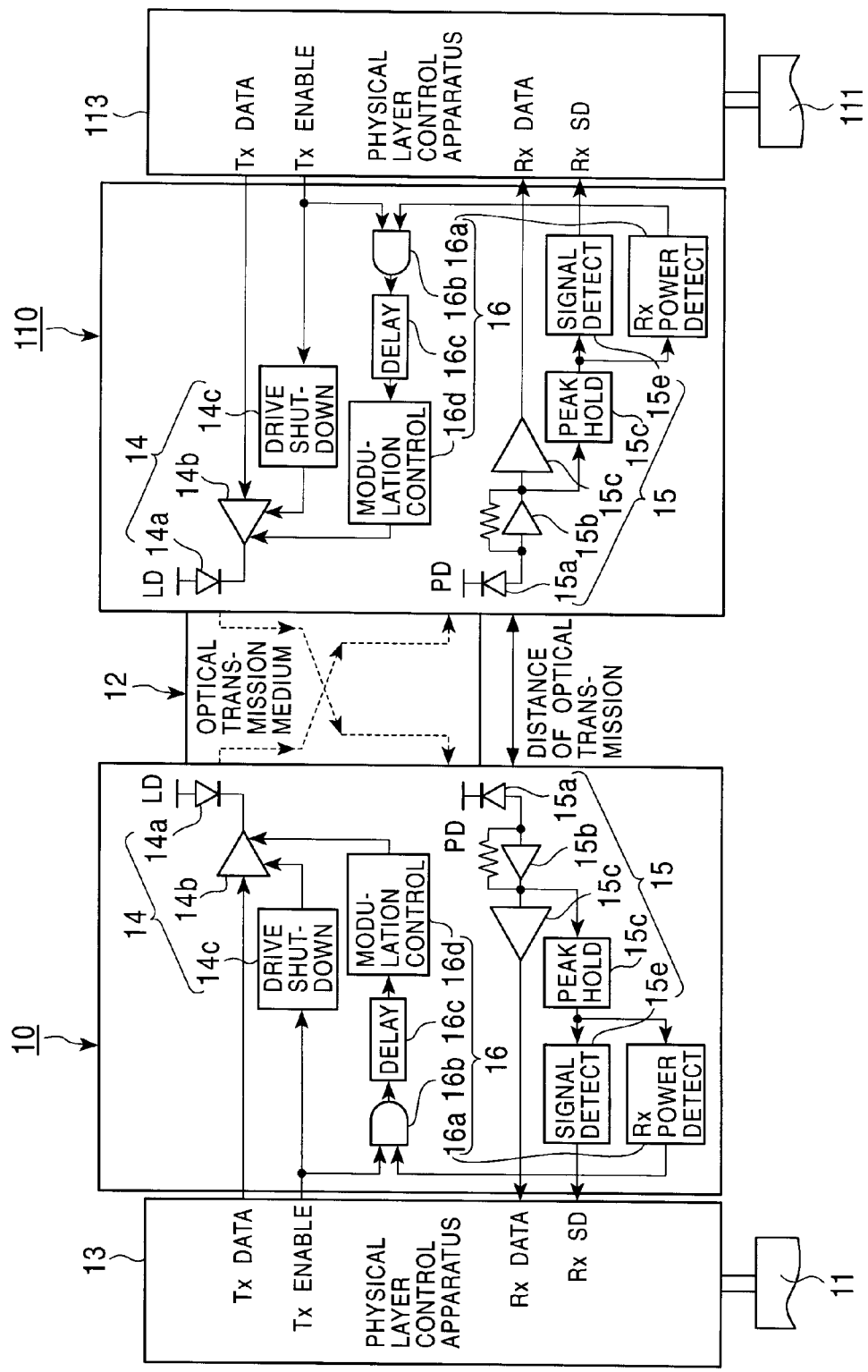
FIG. 7 is a schematic block diagram showing the used state of the first embodiment of an optical transmitter receiver in accordance with the present invention.
Figure 8:
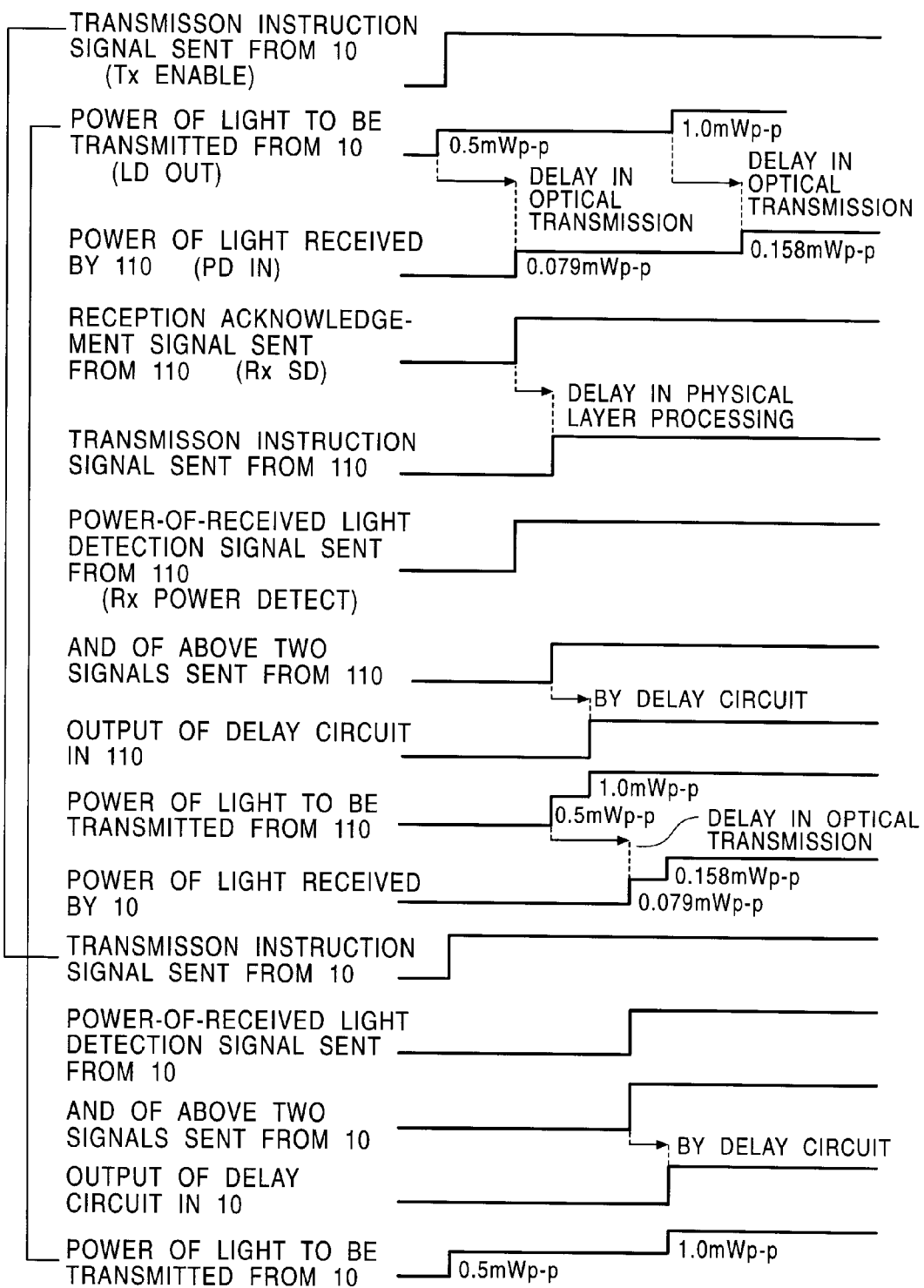
FIG. 8 is a timing chart expressing signals sent from the components of the optical transmitter receivers shown in FIG. 7.
Figure 9:
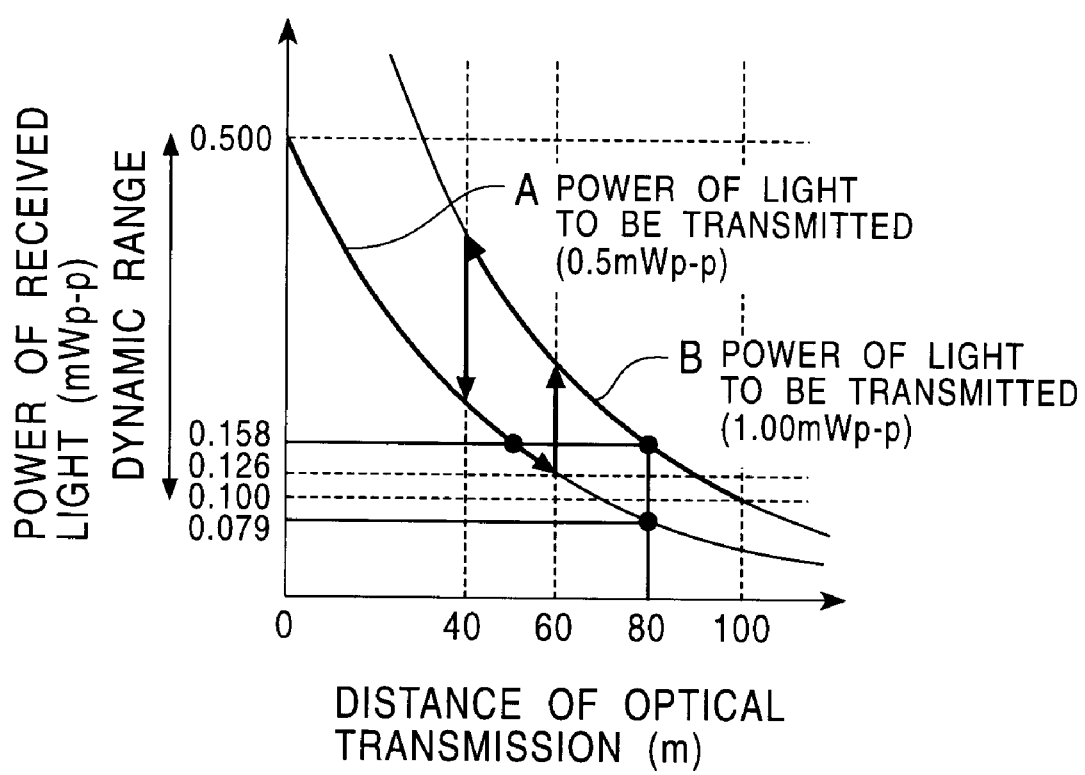
FIG. 9 is a graph expressing the relationship between distances of optical transmission performed by the optical transmitter receivers shown in FIG. 7 and powers of received light, and indicating that the power of light to be transmitted is changed from one value to another.

FIG. 7 shows the configuration of the first embodiment of an optical transmitter receiver in accordance with the present invention.

Referring to FIG. 7, paired optical transmitter receivers 10 and 110 are optically connected to each other over an optical fiber 12, which is an optical transmission medium, between two apparatuses 11 and 111 that optically communicate with each other. The optical transmitter receivers 10 and 110 are connected to the apparatuses 11 and 111 respectively with physical layer control apparatuses 13 and 113 between them.

The optical transmitter receivers 10 and 110 or the physical layer control apparatuses 13 and 113 have the same configuration. The left-hand optical transmitter receiver 10 alone will therefore be described.

Referring to FIG. 7, the optical transmitter receiver 10 consists of a transmitter 14 that is an optical transmitter, a receiver 15 that is an optical receiver, and a controller 16.

The transmitter 14 consists of a laser diode 14a serving as a light emitting device, a drive circuit 14b for driving the laser diode 14a, and a shutdown circuit 14c for controlling driving performed by the drive circuit 14b.

The laser diode 14a converts an input signal into a laser beam whose intensity is proportional to the level of the input signal, and propagates the laser beam to the mate optical transmitter receiver 110 over the optical fiber 12.

The drive circuit 14b drives the laser diode 14a to luminescence according to transmission data Tx Data output from the physical layer control apparatus 13.

The shutdown circuit 14c actuates the drive circuit 14b according to a transmission instruction signal Tx Enable output from the physical layer control apparatus 13.

In contrast, the receiver 15 consists of a photodiode 15a serving as a light receiving device, a current-voltage amplifier 15b, a post-amplifier 15c, a peak hold circuit 15d, and a signal detection circuit 15e.

The photodiode 15a receives a light signal sent from the mate optical transmitter receiver 110 over the optical fiber 12, and outputs an electric signal proportional to the light signal.

The current-voltage amplifier 15b amplifies an output signal of the photodiode 15a.

The post-amplifier 15c amplifies an output signal of the current-voltage amplifier 15b, and transmits reception data Rx Data to the physical layer control apparatus 13.

The peak hold circuit 15d detects the peak value of an output signal of the current-voltage amplifier 15b.

The signal detection circuit 15e detects a signal sent from the peak hold circuit 15d, and transmits a reception acknowledgement signal,Rx SD to the physical layer control apparatus 13.

The physical layer control apparatus 13 controls communications according to a protocol whose level is higher by one step than the protocol according to which the optical transmitter receiver 10 communicates with the mate optical transmitter receiver. In response to an instruction sent from the apparatus 11, the physical layer control apparatus 13 transmits transmission data Tx Data and a transmission instruction signal TX Enable to the optical transmitter receiver 10. The optical transmitter receiver 10 transmits reception data Rx Data and a reception acknowledgement signal Rx SD to the apparatus 11 via the physical layer control apparatus 13.

The controller 16 consists of a power-of-received light detection circuit 16a serving as a signal level detecting means, an AND circuit 16b, a delay circuit 16c, and a modulation control circuit 16d serving as a signal level control means.

The power-of-received light detection circuit 16a makes a judgment as described below according to a peak value detected by the peak hold circuit 15d, and outputs a power-of-received light detection signal RxPower Detect.

The AND circuit 16b inputs a power-of-received light detection signal from the power-of-received light detection circuit 16a and also inputs a transmission instruction signal TX Enable from the physical layer control circuit 13. When both the signals are high, the AND circuit 16b outputs a high-level signal.

The delay circuit 16c inputs an output signal of the AND circuit 16b. When a high-level signal is input from the AND circuit 16b to the delay circuit, the delay circuit outputs a high-level signal in a certain delay time.

The modulation control circuit 16d controls modulation performed by the drive circuit 14 according to a signal output from the delay circuit 16c. For example, when an input signal is high, the power of light to be transmitted is changed to a larger one of two values (for example, 1.000 mWp-p). When the input signal is low, the power of light to be transmitted is changed to a smaller value (for example, 0.500 mWp-p).

According to the embodiment of the present invention, the optical transmitter receiver 10 or 110 has the foregoing components. When the apparatus 11 outputs transmission data to the associated physical layer control apparatus 13, the physical layer control apparatus 13 feeds a transmission instruction signal Tx Enable to the shutdown circuit 14c in the transmitter 14 of the optical transmitter receiver 10. The drive circuit 14b is then actuated.

When transmission data Tx Data is input from the physical layer control apparatus 13 to the drive circuit 14b in the transmitter 14 of the optical transmitter receiver 10, the drive circuit 14b drives the laser diode 14a according to the transmission data.

This causes the laser diode 14a to emit light whose intensity is proportional to the transmission data.

A laser beam emitted from the laser diode 14a falls on the photodiode 15a in the receiver 14 of the mate optical transmitter receiver 110 over the optical fiber 12. This causes the photodiode 15a to output an electric signal proportional to the incident light. The electric signal is amplified by the current-voltage amplifier 15b, and further amplified by the post-amplifier 15c. A resultant signal is input as reception data Rx Data to the other physical layer control apparatus 13. An output signal of the current-voltage amplifier 15b has its peak detected by the peak hold circuit 15d. A reception acknowledgement signal Rx SD is input to the other physical layer control apparatus 113 via the signal detection circuit 15e.

The physical layer control apparatus 113 transmits the reception data to the other apparatus 111.

Thus, the apparatus 11 transmits transmission data Tx Data to the mate apparatus 111.

The mate apparatus 111 in turn transmits transmission data Tx Data to the apparatus 11. Thus, the apparatuses 11 and 111 optically communicate with each other.

A description will be made of an optical fiber adopted as the optical fiber 12 and characterized by an optical transmission loss of 0.1 dB/m relative to any wavelength λ of light to be transmitted, for example, 650, 780, 850, 1300, 1500, or 1550 nm.

Specifically, a plastic optical fiber is adopted. The sensitivity of the photodiode 15a is set to 0.5 A/W, and a gain to be produced by the current-voltage amplifier 15b is set to 4 kΩ. A maximum amplitude of a signal that can be output from the current-voltage amplifier 15b is set to 1 Vp-p, and a minimum amplitude of a signal that can be input to the post-amplifier 15c is set to 0.2 Vp-p. In practice, for example, a silicon pin photodiode and a bipolar chip set will do.

In this case, as mentioned above, the maximum output level of the current-voltage amplifier 15b is 1 Vp-p and the minimum input level of the post-amplifier 15c is 0.2 Vp-p. A dynamic range offered for an output of the current-voltage amplifier 15b is from 0.2 to 1.0 Vp-p.

Since the gain to be produced by the current-voltage amplifier 15b is 4 kΩ, a dynamic range offered for an input of the current-voltage amplifier 15 is from 0.05 to 0.25 mAp-p.

Moreover, since the sensitivity of the photodiode 15a is 0.5 A/W, a dynamic range offered for an input of the photodiode 15a is from 0.1 to 0.5 mWp-p.

Assuming that light received by the optical transmitter receiver 10 or 110 falls on the photodiode with its power 100% maintained, a dynamic range offered for received light by the optical transmitter receiver 10 or 110 is substantially from 0.1 to 0.5 mWp-p.

Assume that the optical fiber 12 has a length of 80 m and the optical transmitter receiver 10 starts optical communication. In this case, the power of light initially transmitted from the optical transmitter receiver 10 is 0.500 mWp-p, and the power of light received by the mate optical transmitter receiver 110 is 0.079 mWp-p as indicated with a curve A shown in FIG. 9. The power of light, that is, 0.079 mWp-p is lower than 0.126 mWp-p that is a criterion specified in the power-of-received light detection circuit 16a in the optical transmitter receiver 110 shown in FIG. 7.

The power-of-received light detection circuit 16a judges that the power of light received is too low and outputs a high-level signal as a power-of-received light detection signal. The high-level signal is output from the AND circuit 16b synchronously with a transmission instruction signal Tx Enable output from the physical layer control apparatus 113. The signal is delayed by a certain delay time, for example, several milliseconds by the delay circuit 16c, and then input to the modulation control circuit 16d.

The power of light to be transmitted from the optical transmitter receiver 110 is changed from 0.500 mWp-p to 1.000 mWp-p in the delay time in the delay time.

On the other hand, the power of light that is transmitted initially from the optical transmitter receiver 110 before the optical transmitter receiver 110 changes the power of light to be transmitted therefrom is 0.500 mWp-p. As seen from the timing chart of FIG. 8 and the graph of FIG. 9, when the optical fiber 12 has a length of 80 m, the power of light received by the optical transmitter receiver 10 in the delay time is 0.079 mWp-p. The power of light, that is, 0.079 mWp-p is lower than 0.126 mWp-p. Consequently, the power-of-received light detection circuit 16a of the optical transmitter receiver 10 outputs a high-level signal to the modulation control circuit 16d via the AND circuit 16b and delay circuit 16c in the certain delay time. The optical transmitter receivers 10 and 110 change the powers of light to be transmitted therefrom from 0.500 mWp-p to 1.000 mWp-p (from a curve A in FIG. 9 to a curve B). The powers of light to be received thereby are 0.158 mWp-p. The powers of light to be transmitted from the optical transmitter receivers are thus set to the same proper value.

In the optical transmitter receiver 10 or 110, a high-level signal output from the power-of-received light detection circuit 16a is synchronized with a transmission instruction signal sent from the physical layer control apparatus 13 or 113. The delay circuit outputs a high-level signal to the modulation control circuit 16d in a certain time after the timing of synchronization. Consequently, the timing according to which the modulation control circuit 16d changes the power of light to be transmitted is delayed by the certain time.

In the optical transmitter receiver 10 or 110, during the delay time, the power-of-received light detection circuit 16a detects the power of light received from the mate optical transmitter receiver 11 or 110 before the power of light to be transmitted therefrom is changed. The power of light to be transmitted can thus be set to a proper value. It will therefore be reliably avoided that one of the optical transmitter receivers changes the power of light to be transmitted therefrom on its own judgment, and that the powers to be transmitted by the optical transmitter receivers 10 and 110 become different from each other.

The optical transmitter receivers 10 and 110 in accordance with the present embodiment can be applied to cases where an optical transmission medium suffering a large optical transmission loss, for example, an optical fiber of low quality is used to perform optical communication or optical space transmission is utilized. Even when an optical transmission medium has lengths whose differences are small, the power of received light will vary greatly. Nevertheless, since the optical transmitter receivers 10 and 110 in accordance with the present embodiment reliably change the powers of light to be transmitted therefrom, the great variation in the power of received light can substantially be reduced. Consequently, the costs of the optical transmitter receivers 10 and 110 are minimized.

Assume that distances of optical transmission permitted by an optical transmission medium greatly differ from one another. Moreover, a glass optical fiber suffering an optical transmission loss of −0.1 dB/km may be substituted for a plastic optical fiber suffering an optical transmission loss of −0.1 dB/m and being employed in the embodiment. In this case, when optical communication is performed over the optical transmission medium permitting the distances of optical transmission whose differences range, for example, from several hundreds meters to several ten kilometers, the power of received light will vary greatly. Nevertheless, since the optical transmitter receivers 10 and 110 in accordance with the embodiment reliably change the powers of light to be transmitted therefrom, the variation in the power of received light is substantially reduced. Consequently, the costs of the optical transmitter receivers 10 and 110 are minimized.

Moreover, a supply voltage to be supplied to the optical transmitter receivers 10 and 110 may be low. For example, the supply voltage may be lowered in order to suppress the power consumption of the optical transmitter receives 10 and 110. In this case, a dynamic range offered by the receiver of the optical transmitter receiver 10 or 110 is narrowed. Even if the variation in the power of received light is small, the dynamic range is insufficient. However, when the optical transmitter receivers 10 and 110 in accordance with the embodiment reliably change the powers to be transmitted therefrom, the variation in the power of received light is substantially reduced. Consequently, optical communication is enabled despite the narrow dynamic range.

Figure 10:
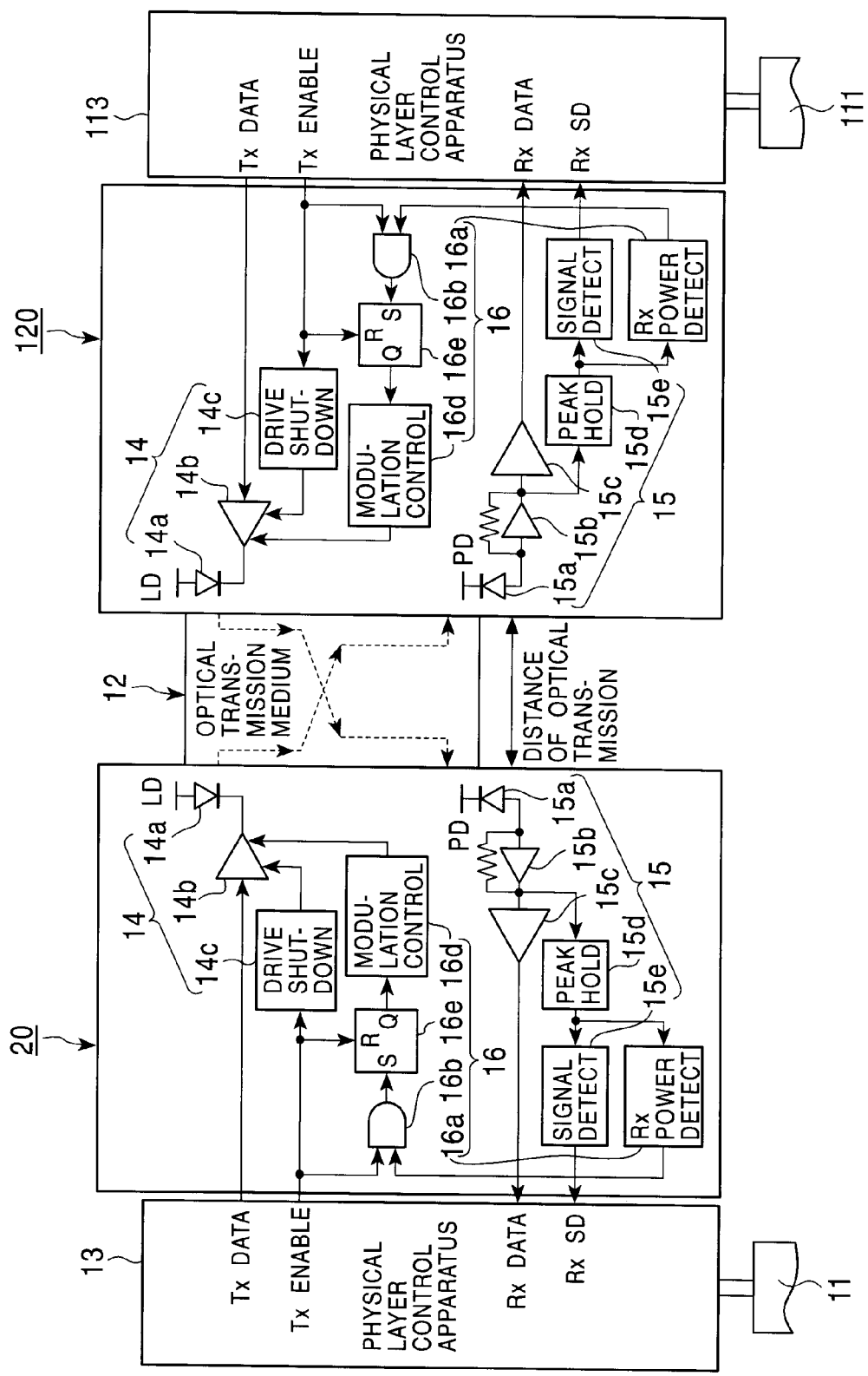
FIG. 10 is a schematic block diagram showing the used state of the second embodiment of an optical transmitter receiver in accordance with the present invention.
Figure 11:
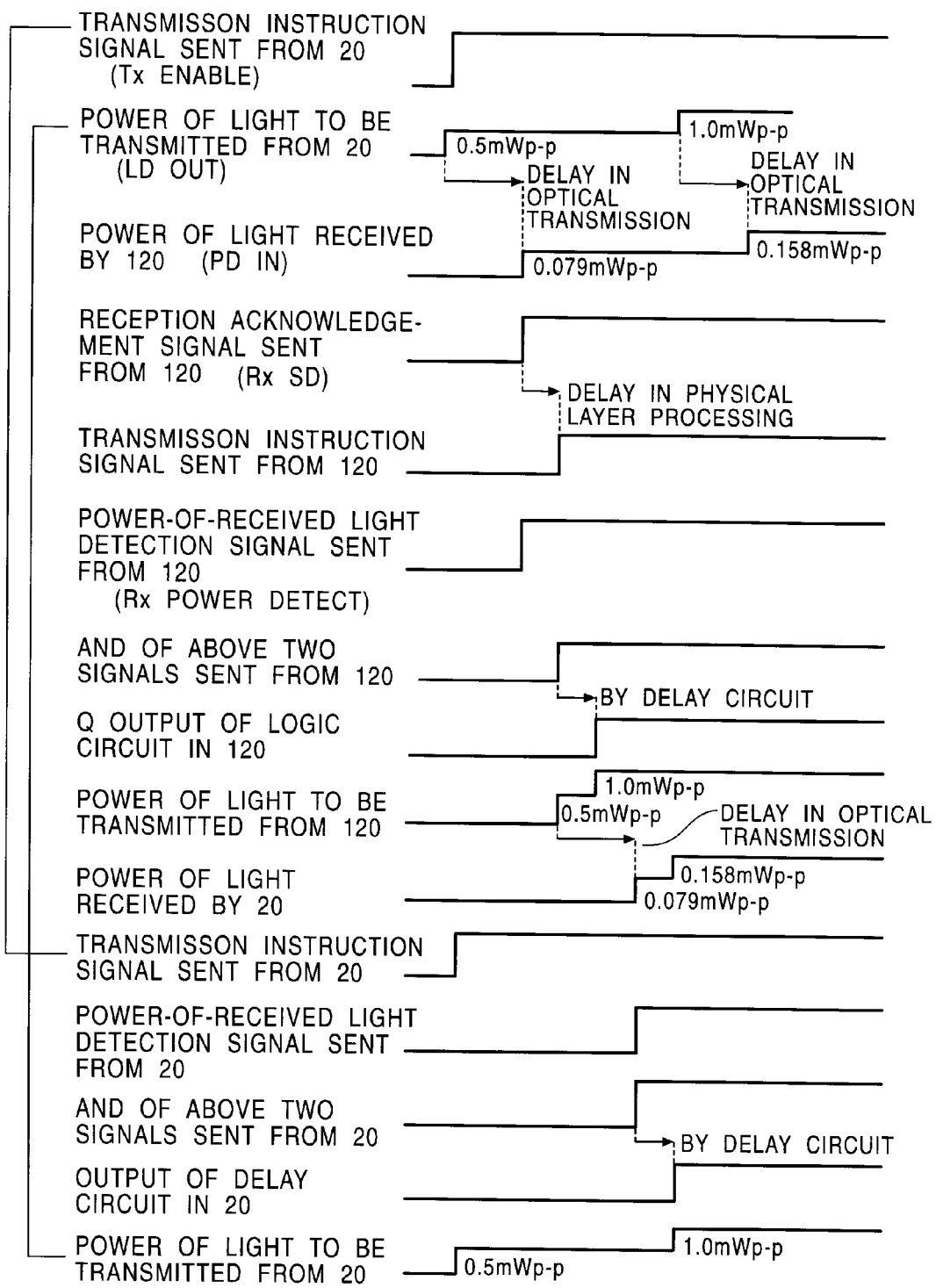
FIG. 11 is a timing chart expressing signals sent from the components of the optical transmitter receivers shown in FIG. 10.

FIG. 10 shows the second embodiment of an optical transmitter receiver in accordance with the present invention.

Referring to FIG. 10, optical transmitter receivers 20 and 120 have substantially the same configuration as the optical transmitter receivers 10 and 110 in accordance with the first embodiment shown in FIG. 7. Only a difference lies in that an R-S flip-flop circuit 16 that is a sort of flop-flop circuit is substituted for the delay circuit 16c. The same reference numerals will be assigned to components identical to those of the first embodiment. The difference alone will be described below.

The R-S flip-flop circuit 16e has an output signal of the AND circuit 16b applied to the S input terminal thereof, and has a transmission instruction signal Tx Enable, which is sent from the physical layer control apparatus 13 or 113, applied to the R input terminal thereof. A Q output of the R-S flip-flop circuit 16e is input to the modulation control circuit 16d.

When a high-level signal is output from the power-of-received light detection circuit 16a, the AND circuit 16b applies a high-level signal synchronously with the transmission instruction signal to the S input terminal of the R-S flip-flop circuit 16e. In a certain delay time, the Q output of the R-S flip-flop circuit 16e is driven high and input to the modulation control circuit 16d. The R-S flip-flop circuit 16e functions similarly to the aforesaid delay circuit 16c.

The optical transmitter receivers 20 and 120 having the foregoing components operate in the same manner as the optical transmitter receivers 10 and 110 in accordance with the first embodiment shown in FIG. 7. Consequently, optical communication is carried out. Incidentally, the power of light to be transmitted is set as described below.

Assume that an optical transmission loss is 0.1 dB/m and a dynamic range offered for receive light is from 0.1 to 0.5 mWp-p. Assume that the optical fiber 12 has a length of 80 m and that the optical transmitter receiver 20 starts optical communication. As seen from FIG. 11 and FIG. 12, the power of light transmitted initially from the optical transmitter receiver 20 is 0.500 mWp-p, and the power of light received by the other optical transmitter receiver 120 is, as seen from a curve C in FIG. 12, 0.079 mWp-p.

The power of received light, that is, 0.079 mWp-p is lower than 0.126 mWp-p that is a criterion specified in the power-of-received light detection circuit 16a. The power-of-received light detection circuit 16a therefore judges that the power of received light is too low, and outputs a high-level signal as a power-of-received light detection signal.

The high-level signal is output from the AND circuit 16b synchronously with a transmission instruction signal Tx Enable sent from the physical layer control apparatus 113 shown in FIG. 10. A resultant signal is then delayed by a certain delay time, for example, several milliseconds by the R-S flip-flow circuit 16e, and then input to the modulation control circuit 16d.

Figure 12:
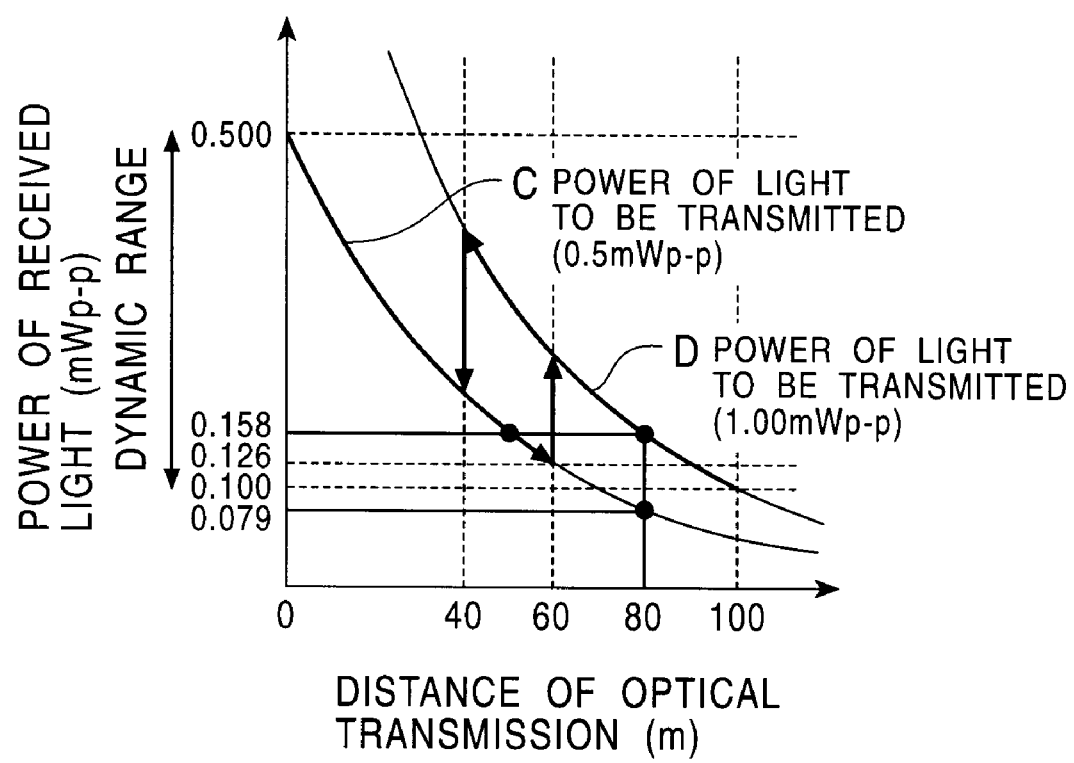
FIG. 12 is a graph expressing the relationship between distances of optical transmission performed by the optical transmitter receivers shown in FIG. 10 and powers of received light, and indicating that the power of light to be transmitted is changed from one value to another.

The power of light to transmitted by the optical transmitter receiver 120 is changed from 0.500 mWp-p to 1.000 mWp-p in the delay time (from a curve C in FIG. 12 to a curve D).

On the other hand, the power of light that is transmitted initially from the optical transmitter receiver 120 before the optical transmitter receiver 120 changes the power of light to be transmitted therefrom is 0.500 mWp-p. When the optical fiber 12 has a length of 80 m, the power of light received by the optical transmitter receiver 20 in the delay time is 0.079 mWp-p. The power of received light, that is, 0.079 mWp-p is lower than 0.126 mWp-p. Consequently, the power-of-received light detection circuit 16a in the optical transmitter receiver 20 shown in FIG. 10 outputs a high-level signal to the modulation control circuit 16d via the AND circuit 16d and R-S flip-flop circuit 16e in the certain delay time.

The optical transmitter receivers 20 and 120 change the powers of light to be transmitted therefrom from 0.500 mWp-p to 1.000 mWp-p. The powers of received light are 0.158 mWp-p. Consequently, the powers of light to be transmitted by the optical transmitter receivers 20 and 120 are set to the same proper value.

In the aforesaid embodiments, the laser diode 15a is used as a light emitting device, and the photodiode 16a is used as a light receiving device. The present invention is not limited to the laser diode and photodiode. Alternatively, any other light emitting device (for example, a light emitting diode) and any other light receiving device (for example, a phototransistor) will do.

In the aforesaid embodiments, the delay circuit 16c or R-S flip-flop circuit 16e is used to delay a power-of-received light detection signal by a certain time. The present invention is not limited to the delay circuit and RS flip-flop circuit. Alternatively, any other circuit such as a logic circuit may be used to delay a signal by a certain time.

As described so far, according to the present invention, there is provided an optical transmitter receiver in which the power of light to be transmitted therefrom is set to a proper value by controlling the relative timing of changing the power of light to be transmitted therefrom.

What is claimed is:

1. An optical transmitter receiver having an optical transmitter for transmitting a light signal to a mate optical transmitter receiver, and an optical receiver for receiving a light signal from the mate optical transmitter receiver, comprising:

a signal level detecting means for detecting the level of a light signal received by said optical receiver;

a signal level control means for changing the power of the light signal to be transmitted from said optical transmitter from one value to another according to the signal level detected by said signal level detecting means; and delay means for delaying changing of the power of a light signal to be transmitted which is performed by said signal level control means;

wherein said delay means is a delay device, and a transmission instruction signal and a signal sent from said signal level detecting means are input to the delay device via an AND circuit.

2. An optical transmitter receiver having an optical transmitter for transmitting a light signal to a mate optical transmitter receiver, and an optical receiver for receiving a light signal from the mate optical transmitter receiver, comprising:

a signal level detecting means for detecting the level of a light signal received by said optical receiver;

a signal level control means for changing the power of the light signal to be transmitted from said optical transmitter from one value to another according to the signal level detected by said signal level detecting means; and a delay means for delaying changing of the pow of a light signal to be transmitted which is performed by said signal level control means;

wherein said delay means is a latch circuit, and the transmission instruction signal and the signal sent from said signal level detecting means are input to the latch circuit via an AND circuit.

3. A method of optical transmission and reception for transmitting or receiving data using light, comprising:

receiving a light signal from a mate optical transmitter receiver;

detecting a level of the received light signal;

delaying the signal whose level has been detected at said signal level detecting step;

controlling said signal level by changing the power of the light signal to be transmitted at a transmission step from one value to another according to the level of the signal delayed at said delaying step; and transmitting the light signal, of which power has been changed, to the mate optical transmitter receiver;

wherein said delaying step comprises:

inputting a transmission instruction signal;

inputting a detection signal whose level has been detected at said signal level detecting step;

outputting the signal, of which said level has been detected, along with input of the transmission instruction signal and the signal whose level has been detected; and delaying the signal whose level has been detected.

* * * * *